(12) United States Patent
Liu et al.

(10) Patent No.: US 12,083,775 B2
(45) Date of Patent: Sep. 10, 2024

(54) PREPARATION METHOD OF DISPLAY APPARATUS AND DISPLAY APPARATUS

(71) Applicant: BOE Technology Group Co., Ltd., Beijing (CN)

(72) Inventors: Lu Liu, Beijing (CN); Xiaofei Luo, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 112 days.

(21) Appl. No.: 17/406,111

(22) Filed: Aug. 19, 2021

(65) Prior Publication Data
US 2022/0097339 A1     Mar. 31, 2022

(30) Foreign Application Priority Data

Sep. 30, 2020 (CN) .......................... 202011062386.0

(51) Int. Cl.
*B32B 3/04*     (2006.01)
*B32B 7/12*     (2006.01)
(Continued)

(52) U.S. Cl.
CPC .................. *B32B 3/04* (2013.01); *B32B 7/12* (2013.01); *B32B 15/18* (2013.01); *B32B 27/06* (2013.01);
(Continued)

(58) Field of Classification Search
None
See application file for complete search history.

(56) References Cited

U.S. PATENT DOCUMENTS 3,701,706 A * 10/1972 Giddings ................ B32B 37/26
156/228
11,590,748 B2 * 2/2023 Kim ........................ B32B 37/10
(Continued)

FOREIGN PATENT DOCUMENTS

CN       104471630 A     3/2015
CN       107978623 A     5/2018
(Continued)

OTHER PUBLICATIONS

English machine translation of CN 108877529 A, Hu et al, Nov. 23, 2018, 22 pages. (Year: 2018).*
(Continued)

*Primary Examiner* — Linda L Gray
(74) *Attorney, Agent, or Firm* — Ling Wu; Stephen Yang; Ling and Yang Intellectual Property

(57) ABSTRACT

A preparation method of a display apparatus and the display apparatus are provided, the method and the apparatus are relating to a field of display technologies, an edge of at least a side of a flexible display module of the display apparatus is bent to a back side of the flexible display module to form a first bending portion; the preparation method includes providing a flexible display assembly, which includes a flexible display module and a first supporting plate fitted to a display surface of the flexible display module; the first supporting plate is made of a rigid material; an edge of at least a side of the first supporting plate is bent toward a side where the flexible display module is located to form a second bending portion.

16 Claims, 1 Drawing Sheet

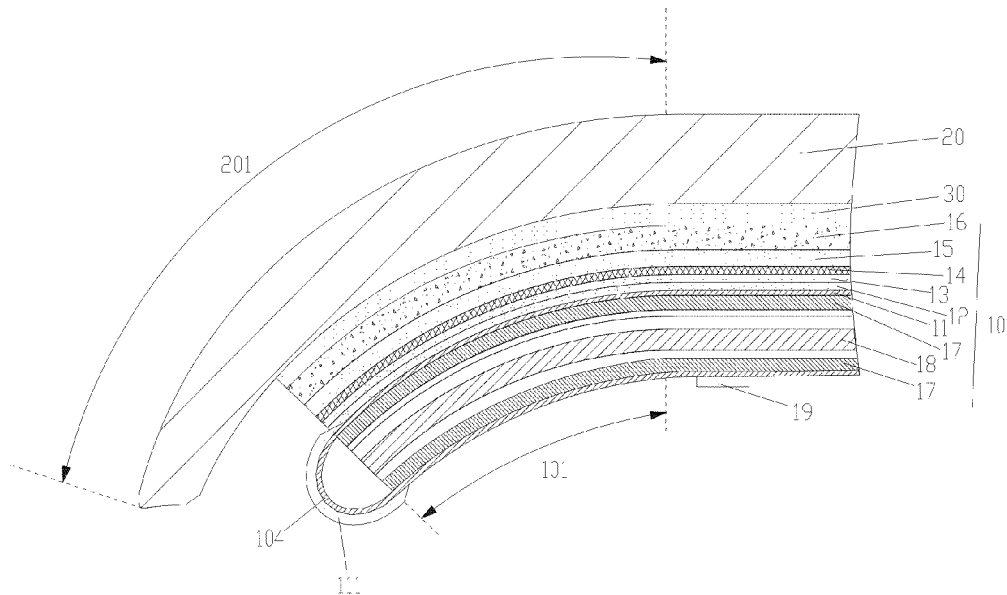

(51) Int. Cl.
    *B32B 15/18*         (2006.01)
    *B32B 27/06*         (2006.01)
    *B32B 38/00*         (2006.01)
    *B32B 38/10*         (2006.01)

(52) U.S. Cl.
    CPC .......... *B32B 38/0008* (2013.01); *B32B 38/10* (2013.01); *B32B 2457/20* (2013.01)

(56) References Cited

U.S. PATENT DOCUMENTS

| | | | |
|---|---|---|---|
| 11,691,407 B2 * | 7/2023 | Kwon | B32B 38/004 156/60 |
| 2014/0002975 A1 | 1/2014 | Lee et al. | |
| 2020/0122383 A1 | 4/2020 | Egashira | |

FOREIGN PATENT DOCUMENTS

| | | |
|---|---|---|
| CN | 207690424 U | 8/2018 |
| CN | 110444119 A | 11/2019 |
| CN | 111131570 A | 5/2020 |
| CN | 111312079 A | 6/2020 |
| CN | 210836910 U | 6/2020 |
| CN | 111681539 A | 9/2020 |
| CN | 111681543 A | 9/2020 |
| CN | 111682128 A | 9/2020 |
| JP | 2018-103572 A | 7/2018 |

OTHER PUBLICATIONS

Office Action dated Nov. 24, 2021 for Chinese Patent Application No. 202011062386.0 and English Translation.

* cited by examiner

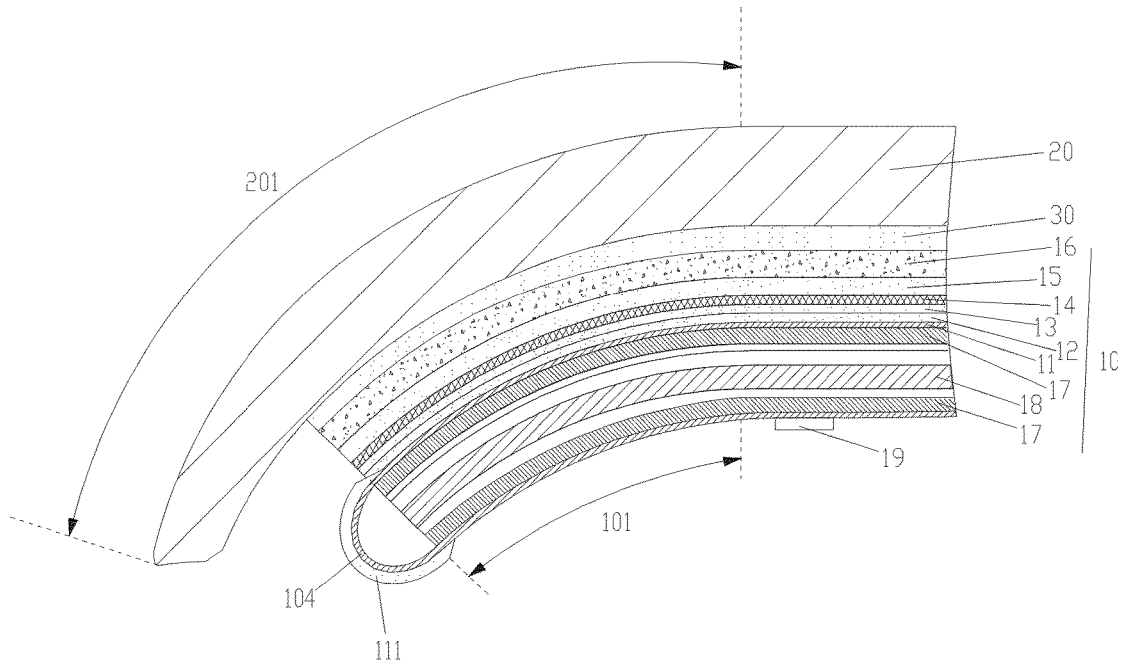

FIG. 1

| Providing a flexible display assembly, wherein the flexible display assembly includes a flexible display module and a first supporting plate fitted to a display surface of the flexible display module; at least an edge of a side of the flexible display module is bent toward a back side of the flexible display module to form a first bending portion; the first supporting plate is made of a rigid material; an edge of at least one side of the first supporting plate is bent toward a side where the flexible display module is located to form a second bending portion; and a first surface of the first bending portion fits to the second bending portion to maintain a bending shape of the first bending portion; | S1 |
|---|---|
| Installing the flexible display assembly on the machine body, and removing the first supporting plate, making the first surface of the first bending portion pressed against the machine body to maintain the bending shape of the first bending portion. | S2 |

FIG. 2

PREPARATION METHOD OF DISPLAY APPARATUS AND DISPLAY APPARATUS

CROSS-REFERENCE TO RELATED APPLICATION

The present application claims the priority of Chinese Patent Application No. 202011062386.0 filed to the CNIPA on Sep. 30, 2020, the content of which is incorporated herein by reference.

TECHNICAL FIELD

Embodiments of present disclosure relate to, but are not limited to, the field of display technologies, in particular to a preparation method of a display apparatus and the display apparatus.

BACKGROUND

With the development of flexible display technology, there are more and more application forms of flexible display screen, such as curved screens with fixed curvature, folding screens, wristbands, rolling screens, etc. Folding modes of a foldable display apparatus may be divided into outward folding and inward folding. The outward folding means that when the foldable display apparatus is under a folded state, a display side of the flexible display module of the foldable display apparatus is on an outer side and a flexible cover plate of the flexible display module is exposed to the outside, which has high requirement for hardness and impact resistance of the flexible cover plate. Inward folding means that when the foldable display apparatus is under a folded state, the flexible display module of the foldable display apparatus is on an inner side, which may effectively protect the flexible display module from external impacts when in a folded state, and reduce risks of failure of the flexible display module. The inward folding method requires relatively lower hardness of the flexible display module, but higher bending radius (for example, R1 mm-R3 mm).

At present, in order to achieve an appearance beautification effect of the foldable display apparatus, an edge of the flexible display module will be made into a bending shape. However, in a preparation process of the display apparatus, the flexible display module with curved edge is prone to problems of film cracking and peeling.

SUMMARY

An overview of a subject elaborated in the disclosure is described below. This summary is not intended to limit the protection scope of claims.

An embodiment of the present disclosure provides a preparation method for a display apparatus, wherein the display apparatus includes a machine body and a flexible display module assembled on the machine body, an edge of at least a side of the flexible display module is bent toward a back side of the flexible display module to form a first bending portion, and the preparation method includes the following steps:

providing a flexible display assembly, wherein the flexible display assembly includes a flexible display module and a first supporting plate fitted to a display surface of the flexible display module; the first supporting plate is made of a rigid material; an edge of at least a side of the first supporting plate is bent toward a side where the flexible display module is located to form a second bending portion; and a first surface of the first bending portion fits to the second bending portion to maintain a bending shape of the first bending portion;

installing the flexible display assembly on the machine body, and removing the first supporting plate, making the first surface of the first bending portion pressed against the machine body to maintain the bending shape of the first bending portion.

In an exemplary embodiment, the flexible display module includes a flexible display substrate, and a second supporting plate disposed on a side of the flexible display substrate away from a display side, wherein the second supporting plate is made of a rigid material, and an edge of a corresponding side of the second supporting plate has a same bending shape as the first bending portion.

In an exemplary embodiment, a material of the second supporting plate is stainless steel, and a thickness of the second supporting plate is 0.1 mm-0.5 mm.

In an exemplary embodiment, the flexible display module and the first supporting plate are bonded by an adhesive layer, and a viscosity of a material of the adhesive layer is reduced after being exposed to light or heated.

In an exemplary embodiment, removing the first supporting plate includes irradiating a surface of the first supporting plate away from the flexible display module with ultraviolet light or laser light to reduce the adhesive strength of the adhesive layer, and then removing the first supporting plate.

In an exemplary embodiment, an edge of the first supporting plate on a side where the second bending portion is located protrudes from an edge of the flexible display module on a side where the first bending portion is located.

In an exemplary embodiment, the first supporting plate is made of any one or more of polyethylene terephthalate, polypropylene, polyethylene naphthalate, polycarbonate and polymethylmethacrylate.

In an exemplary embodiment, a thickness of the first supporting plate is greater than or equal to 0.5 mm.

In an exemplary embodiment, the flexible display module is rectangular in shape, and edge of any one of four sides of the flexible display module forms the first bending portion, or edges of a plurality of sides of the edges of the four sides of the flexible display module all form the first bending portion.

An embodiment of the present disclosure further provides a display apparatus manufactured with any one of the above preparation methods for the display apparatus.

Other aspects will become apparent upon reading and understanding accompanying drawings and the detailed description.

BRIEF DESCRIPTION OF DRAWINGS

The attached drawings are for providing a further understanding for technical schemes of the present disclosure and constitute a part of the description. They are for explaining the technical schemes of the present disclosure together with the embodiments of the present disclosure and do not constitute a limitation on the technical schemes of the present disclosure.

FIG. 1 is a schematic diagram of a structure of a flexible display assembly in a preparation method of a display apparatus according to an embodiment of the present disclosure in some exemplary embodiments;

FIG. 2 is a schematic flow chart of a preparation method of a display apparatus according to an embodiment of the present disclosure in some exemplary embodiments.

DETAILED DESCRIPTION

The technical solutions of the disclosure will be further described below in combination with the drawings through embodiments. It may be appreciated that the embodiments described herein are merely illustrative of the present disclosure and do not limit the present disclosure. The embodiments and features in the embodiments in the present disclosure may be combined randomly if there is no conflict.

An embodiment of the present disclosure provides a preparation method of a display apparatus, which includes a flexible display module, wherein at least an edge of a side of the flexible display module is bent towards a back side (a side away from the display side) of the flexible display module to form a first bending portion. In some examples, an overall outline of the flexible display module may be rectangular, and edge of any side of the flexible display module may form a first bending portion, or edges of two sides, edges of three sides or edges of four sides of the flexible display module may all form a first bending portion. The display apparatus of the embodiment of the present disclosure may be a foldable display apparatus, and a bending radius of the flexible display module may be 3 mm-5 mm.

In some exemplary embodiments, the flexible display module may include a flexible display substrate, a functional film layer (such as a touch structure layer, a fingerprint identification structure layer, etc.) and a flexible cover plate stacked on a display side of the flexible display substrate, and a supporting film layer and a heat dissipation film layer stacked on a back side of the flexible display substrate. Exemplarily, as shown in FIG. 1, the flexible display module 10 includes a flexible display substrate 11, a touch structure layer 13, a polarizer 14, and a flexible cover plate 16 sequentially stacked on a display side of the flexible display substrate 11, a back film 17 attached to a side of the flexible display substrate 11 away from the display side, and a second supporting portion 18 disposed on a side of the back film 17 away from the flexible display substrate 11. The flexible display substrate 11 and the touch structure layer 13 may be bonded by a first adhesive layer 12, and the polarizer 14 and the flexible cover plate 16 may be bonded by a second adhesive layer 15, and both the first adhesive layer 12 and the second adhesive layer 15 may be made of Optical Clear Adhesive (OCA). The second supporting portion 18 may be made of a rigid material, such as stainless steel (SUS), with a thickness of 0.1 mm-0.5 mm. The second supporting portion 18 may have functions of supporting and dissipating heat. In other embodiments, a Flexible Multi-Layer On Cell (FMLOC) touch technology may be adopted, and the touch structure layer 13 is directly disposed on an encapsulation structure layer of the flexible display substrate 11.

In some exemplary embodiments, as shown in FIG. 1, the flexible display substrate 11 has a bonding region configured to be bonded to a driving integrated circuit (IC) 19 and a flexible printed circuit board (FPC), and the binding region may be bent to a back side of the flexible display substrate through a bending region of the flexible display substrate 11. An outer surface of the bending region of the flexible display substrate 11 may be provided with a protective adhesive 111. The protective adhesive 111 may be a UV-curable protective adhesive (such as Micro coating layer (MCL) adhesive), or polyester polyurethane adhesive, etc., so that a lead layer of the bending region is located in a neutral layer during a process of bending formation (not stretched or compressed during the bending process), thereby preventing the lead layer in the bending region from being stretched and broken. The back film 17 is used to protect the flexible display substrate 11. And a portion of the back film 17 corresponding to the bending region of the flexible display substrate 11 may be of a hollow design, so that the leads of the bending region may be prevented from being broken or being peeled off when the flexible display substrate 11 is squeezed during the period that the flexible display substrate is bent to form a bending region 104. In other embodiments, a bonding region of a flexible display substrate may not be bent to a back side of the flexible display substrate, and a FPC bonded to the bonding region may be bent to the back side of the flexible display substrate.

In some exemplary embodiments, as shown in FIG. 1, at least an edge of a side of the flexible display module 10 forms a first bending portion 101, and then edges of all film layers and structure layers on the corresponding sides of the flexible display module 10 form a same bending shape as the first bending portion 101. In the flexible display module 10, except the second supporting portion 18 is a rigid material, other film layers may be all flexible film layers, which may be bent and deformed.

Since the cover plate of the flexible display module is made of flexible material and may be bent repeatedly, it may not provide support. In order to maintain an edge bending shape of the flexible display module 10 (that is, a shape of the first bending portion), an edge of a corresponding side of the rigid second supporting portion 18 is designed to be bent to fix the shape of the first bending portion 101. However, due to large rebound force of the first bending portion 101 of the flexible display module 10, it is easy for the second supporting portion 18 to peel off from the rest of the flexible display module 10. If the second supporting portion 18 and the rest of the flexible display module 10 are tightly bonded by using adhesives with great adhesion, a film encapsulation structure layer of the flexible display substrate 11 will peel off from the flexible display substrate 11 due to rebound force of the flexible cover plate 16, so that the function of the flexible display module 10 will be failed.

As shown in FIG. 2, an embodiment of the present disclosure provides a preparation method of a display apparatus, which includes a machine body and a flexible display module installed on the machine body, an edge of at least one side of the flexible display module is bent toward a back side of the flexible display module to form a first bending portion, and the preparation method includes the following steps:

S1. Providing a flexible display assembly, exemplarily, as shown in FIG. 1, the flexible display assembly includes a flexible display module 10 and a first supporting plate 20 attached to a display surface of the flexible display module 10, wherein the first supporting plate 20 is made of a rigid material, and an edge of at least a side of the first supporting plate 20 is bent toward a side where the flexible display module 10 is located to form a second bending portion 201, and a first surface of the first bending portion 101 fits to the second bending portion 201 to maintain a bending shape of the first bending portion 101;

S2. Installing the flexible display module 10 on the machine body, and removing the first supporting plate 20, making the first surface of the first bending portion 101 pressed against the machine body to maintain the bending shape of the first bending portion 101.

In the preparation method of the display apparatus according to the embodiment of the present disclosure, before the flexible display module 10 is not integrally assembled with the machine body of the display apparatus (the machine body may be, for example, a housing frame of the display apparatus), the first supporting plate 20 is attached to a display surface of the flexible display module 10, and an edge of the first supporting plate 20 on a side corresponding to the first bending portion 101 is designed to be bent to form a second bending portion 201. A first surface of the first bending portion 101 fits to the second bending portion 201, so that the first supporting plate 20 may balance rebound force of the first bending portion 101 of the flexible display module 10, maintain a bending shape of the first bending portion 101, and problems of film layer peeling and cracking of the flexible display module 10 are not easy to occur. Thereafter, after the flexible display module 10 attached to the first supporting plate 20 is assembled and integrated with the display apparatus body, the first supporting plate 20 is removed, so that the rebound force of the first bending portion 101 of the flexible display module 10 may be balanced by the display apparatus body, thereby fixing the bending shape of the first bending portion 101 and reducing the problems of film peeling and cracking of the flexible display module 10.

In some exemplary embodiments, as shown in FIG. 1, the flexible display module 10 and the first supporting plate 20 are bonded by a third adhesive layer 30, and a material of the third adhesive layer 30 may be a viscosity reducing material. After being exposed to light or heating, the viscosity decreases, and bonding strength between the flexible display module 10 and the first supporting plate 20 decreases. Therefore, the first supporting plate 20 may be removed. An outermost structure of a display surface of the flexible display module 10 is a flexible cover plate 16, and the first supporting plate 20 is bonded to an outer surface of the flexible cover plate 16 by a third adhesive layer 30.

In an example of this embodiment, the removal of the first supporting plate 20 includes irradiating a surface of the first supporting plate 20 away from the flexible display module 10 with ultraviolet light or laser light to reduce the adhesive strength of the third adhesive layer 30, and then removing the first supporting plate 20.

A material of the first supporting plate 20 may be transparent hard plastic, and the first supporting plate 20 is designed as a transparent material, so that light may irradiates the third adhesive layer 30 through the first supporting plate 20, thereby reducing the viscosity of the third adhesive layer 30. Ultraviolet transmittance of the first supporting plate 20 may be greater than 85%. The first supporting plate 20 may be made of any one or more of polyethylene terephthalate (PET), polypropylene (PP), polyethylene naphthalate (PEN), polycarbonate (PC) and polymethylmethacrylate (PMMA). A thickness of the first supporting plate 20 may be equal to or greater than 0.5 mm.

In some exemplary embodiments, as shown in FIG. 1, an edge of the first supporting plate 20 on a side where the second bending portion 201 is located may protrude from an edge of the flexible display module 10 on a side where the first bending portion 101 is located. In this way, a first surface of the first bending portion 101 may completely fit the first supporting plate 20, and a shape of the first bending portion 101 may be better maintained.

In some exemplary embodiments, as shown in FIG. 1, the flexible display module 10 includes a flexible display substrate 11, and a second supporting plate 18 disposed on a side of the flexible display substrate 11 away from a display side, wherein the second supporting plate 18 is made of a rigid material, and an edge of a corresponding side of the second supporting plate 18 has a same bending shape as the first bending portion 101. In this example, except for the second supporting plate 18, the other film layers and structure layers of the flexible display module 10 are all flexible layers which may be bent and deformed. These flexible film layers and structure layers are fixed between the rigid first supporting plate 20 and the rigid second supporting plate 18, which may better maintain shapes and prevent peeling and cracking between these flexible film layers and structure layers. Exemplarily, a material of the second supporting plate 18 is stainless steel, and a thickness of the second supporting plate is 0.1 mm-0.5 mm.

An embodiment of the present disclosure further provides a display apparatus manufactured with any one of the above preparation methods for the display apparatus. The display apparatus may be: any product or component with a display function, such as a mobile phone, a tablet, a television, a display, a laptop, a digital photo frame, or a navigator.

In the description of embodiments of the present disclosure, it should be noted that orientation or positional relationships indicated by terms including "on", "under", "left", "right", "upper", "inside", "outside", "axial direction", "four corners" and the like are based on the orientation or positional relationships shown in the drawings, and are for an easy and brief description of the present disclosure and are not intended to indicate or imply that the mentioned structures must have a specific orientation, or be constructed and operated in a particular orientation, and therefore these expressions should not be construed as limitation to the present disclosure.

In the description of embodiments of the present disclosure, unless otherwise explicitly specified or defined, the terms "connect", "fixed connection", "install" and "assemble" are to be understood broadly, for example, a connection may be a fixed connection, or a detachable connection, or an be integral connection. The terms "install", "connect" and "fixed connection" may refer to a direct connection, or an indirect connection through an intermediate medium, or an internal connection between two elements. Those of ordinary skills in the art may understand the specific meanings of the above mentioned terms in the present disclosure according to specific context.

What is claimed is:

1. A preparation method for a display apparatus,
wherein the display apparatus comprises a machine body and a flexible display module assembled on the machine body, an edge of at least one side of the flexible display module is bent toward a back side of the flexible display module to form a first bending portion, and the preparation method comprises:
providing a flexible display assembly, wherein the flexible display assembly comprises the flexible display module and a first supporting plate fit to a display surface of the flexible display module; the first supporting plate is made of a rigid material; an edge of at least one side of the first supporting plate is bent toward a side where the flexible display module is located to form a second bending portion; and a first surface of the first bending portion fits to the second bending portion to maintain a bending shape of the first bending portion; and
installing the flexible display assembly on the machine body, and removing the first supporting plate, making the first surface of the first bending portion pressed against the machine body to maintain the bending shape of the first bending portion,
wherein the flexible display module and the first supporting plate are bonded by an adhesive layer, and viscosity of a material of the adhesive layer is reduced after being exposed to light or heated.

2. The preparation method for the display apparatus of claim 1, wherein, the flexible display module comprises a flexible display substrate, and a second supporting plate disposed on a side of the flexible display substrate away from a display side, wherein the second supporting plate is made of a rigid material, and an edge of a corresponding side of the second supporting plate has a same bending shape as the first bending portion.

3. The preparation method for the display apparatus of claim 2, wherein a material of the second supporting plate is a stainless steel, and a thickness of the second supporting plate is 0.1 mm to 0.5 mm.

4. The preparation method for the display apparatus of claim 1, wherein removing the first supporting plate comprises:
   irradiating a surface of the first supporting plate away from the flexible display module with ultraviolet light or laser light to reduce adhesive strength of the adhesive layer, and then removing the first supporting plate.

5. The preparation method for the display apparatus of claim 1, wherein an edge of the first supporting plate on a side where the second bending portion is located protrudes from an edge of the flexible display module on a side where the first bending portion is located.

6. The preparation method for the display apparatus of claim 1, wherein a material of the first supporting plate is any one or more of polyethylene terephthalate, polypropylene, polyethylene naphthalate, polycarbonate and polymethylmethacrylate.

7. The preparation method for the display apparatus of claim 6, wherein a thickness of the first supporting plate is equal to or greater than 0.5 mm.

8. The preparation method for the display apparatus of claim 1, wherein the flexible display module is rectangular in shape, and edge of any one of four sides of the flexible display module forms the first bending portion, or edges of a plurality of sides of the edges of the four sides of the flexible display module all form the first bending portion.

9. A display apparatus, comprising:
   a machine body and a flexible display module assembled on the machine body, wherein
   an edge of at least one side of the flexible display module is bent toward a back side of the flexible display module to form a first bending portion; the display apparatus is manufactured by a preparation method, and the preparation method comprises:
   providing a flexible display assembly, wherein the flexible display assembly comprises the flexible display module and a first supporting plate fit to a display surface of the flexible display module; the first supporting plate is made of a rigid material; an edge of at least one side of the first supporting plate is bent toward a side where the flexible display module is located to form a second bending portion; and a first surface of the first bending portion fits to the second bending portion to maintain a bending shape of the first bending portion;
   installing the flexible display assembly on the machine body, and removing the first supporting plate, making the first surface of the first bending portion pressed against the machine body to maintain the bending shape of the first bending portion,
   wherein the flexible display module and the first supporting plate are bonded by an adhesive layer, and a viscosity of a material of the adhesive layer is reduced after being exposed to light or heated.

10. The display apparatus of claim 9, wherein the flexible display module comprises a flexible display substrate, and a second supporting plate disposed on a side of the flexible display substrate away from a display side, wherein the second supporting plate is made of a rigid material, and an edge of a corresponding side of the second supporting plate has a same bending shape as the first bending portion.

11. The display apparatus of claim 10, wherein a material of the second supporting plate is a stainless steel, and a thickness of the second supporting plate is 0.1 mm-0.5 mm.

12. The display apparatus of claim 9, wherein removing the first supporting plate comprises irradiating a surface of the first supporting plate away from the flexible display module with ultraviolet light or laser light to reduce adhesive strength of the adhesive layer, and then removing the first supporting plate.

13. The display apparatus of claim 9, wherein an edge of the first supporting plate on a side where the second bending portion is located protrudes from an edge of the flexible display module on a side where the first bending portion is located.

14. The display apparatus of claim 9, wherein a material of the first supporting plate is any one or more of polyethylene terephthalate, polypropylene, polyethylene naphthalate, polycarbonate and polymethylmethacrylate.

15. The display apparatus of claim 14, wherein a thickness of the first supporting plate is equal to or greater than 0.5 mm.

16. The display apparatus of claim 9, wherein the flexible display module is rectangular in shape, and edge of any one of four sides of the flexible display module forms the first bending portion, or edges of a plurality of sides of the edges of the four sides of the flexible display module all form the first bending portion.

\* \* \* \* \*